US005954180A

United States Patent [19]
Critchley

[11] Patent Number: 5,954,180
[45] Date of Patent: Sep. 21, 1999

[54] APPARATUS FOR THE DETECTION OF COUNTERFEIT DOCUMENTS

[76] Inventor: David John Critchley, Nieppe Villa, West Buckland, Somerset TA21 9LA, United Kingdom

[21] Appl. No.: 08/952,360

[22] PCT Filed: Mar. 17, 1997

[86] PCT No.: PCT/GB97/00727

§ 371 Date: Nov. 17, 1997

§ 102(e) Date: Nov. 17, 1997

[87] PCT Pub. No.: WO97/35285

PCT Pub. Date: Sep. 25, 1997

[30] Foreign Application Priority Data

Mar. 18, 1996 [GB] United Kingdom .................. 9605627

[51] Int. Cl.[6] ...................................................... G06K 5/00
[52] U.S. Cl. ........................................... 194/207; 118/264
[58] Field of Search .................................... 194/206, 207; 118/264

[56] References Cited

U.S. PATENT DOCUMENTS

| | | | |
|---|---|---|---|
| 2,646,717 | 7/1953 | Selgin | 194/207 |
| 3,688,886 | 9/1972 | Siby | 194/206 |
| 4,180,430 | 12/1979 | Gelman | 156/441.5 |
| 5,057,268 | 10/1991 | Muller | 376/157 |
| 5,063,163 | 11/1991 | Carmeli | 436/94 |
| 5,209,806 | 5/1993 | Hibberd | 118/264 |
| 5,316,581 | 5/1994 | Staniszewski | 118/246 |
| 5,417,316 | 5/1995 | Harbaugh | 194/206 |
| 5,531,828 | 7/1996 | Whang | 118/264 |

FOREIGN PATENT DOCUMENTS

| | | |
|---|---|---|
| 391542 | 10/1990 | European Pat. Off. . |
| 2734385 | 11/1996 | France . |
| 508438 | 6/1939 | Sweden . |
| WO 9312416 | 6/1993 | WIPO . |
| WO 9502869 | 1/1995 | WIPO . |

*Primary Examiner*—F. J. Bartuska
*Assistant Examiner*—Bryan J. Jaketic
*Attorney, Agent, or Firm*—Faustino A. Lichauco; Lahive & Cockfield, LLP

[57] ABSTRACT

An apparatus for detecting counterfeit documents has a gate defining a path through which documents can be passed to engage a nib which transfers a reactive liquid from a reservoir to a document. The reactive liquid reacts with the document to indicate whether the document is a counterfeit. To limit the evaporation of reactive liquid, a seal seals the nib from the atmosphere when no document is in the path.

17 Claims, 3 Drawing Sheets

APPARATUS FOR THE DETECTION OF COUNTERFEIT DOCUMENTS

This invention relates to apparatus for the detection of counterfeit documents and more particularly to apparatus for the detection of counterfeit banknotes or security papers.

BACKGROUND

Counterfeit documents are a serious problem for people who have to handle documents and supply goods or services in exchange for or as guaranteed by the documents. The most obvious examples are banknotes, bonds, share certificates and similar documents used in finance and banking, but problems also exist in other less spectacular situations such as forged gift tokens or tickets for a sporting occasion, concert or theatre. In all cases the chances of the counterfeit documents passing undetected are improved the more the person receiving the document is under pressure and therefore the less time the person has to notice or query a suspect document.

Moreover, as counterfeiting techniques have become more and more sophisticated it has become much harder for an untrained person to identify a counterfeit banknote quickly, particularly if the counterfeit note is only one of a number tendered simultaneously.

It is an object of the present invention to provide apparatus that can quickly and reliably detect a counterfeit document.

SUMMARY OF THE INVENTION

The present invention is an apparatus for detecting counterfeit documents comprising: a gate for receiving a document to be checked; a reservoir for a liquid that will react with, in a known way, a component of or an ingredient in the printing or composition of the document; a nib, within the gate to be charged with liquid from the reservoir and disposed to apply the liquid to the document received into the gate; and a seal around the nib to reduce loss of the liquid when there is no document in the gate.

BRIEF DESCRIPTION OF THE DRAWINGS

An embodiment of the present invention will now be described, by way of example, with reference to the accompanying drawings, in which.

DESCRIPTION OF THE ILLUSTRATED EMBODIMENT

Figure 1:
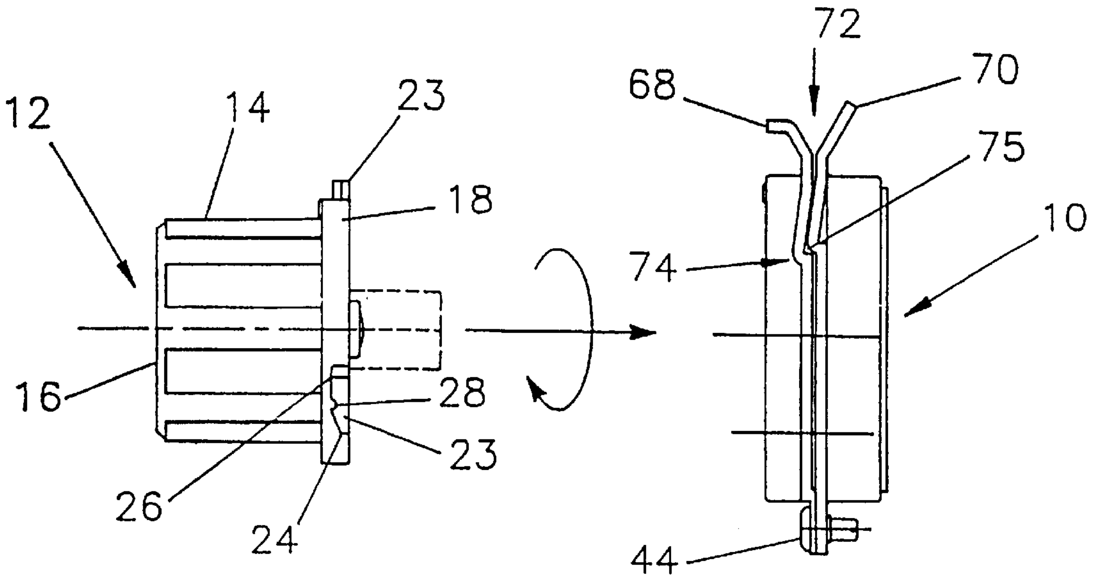
FIG. 1 is a side elevation of an apparatus comprising a reservoir and a gate according to the present invention-before assembly, the gate being partially cut away to show internal detail.
Figure 2:
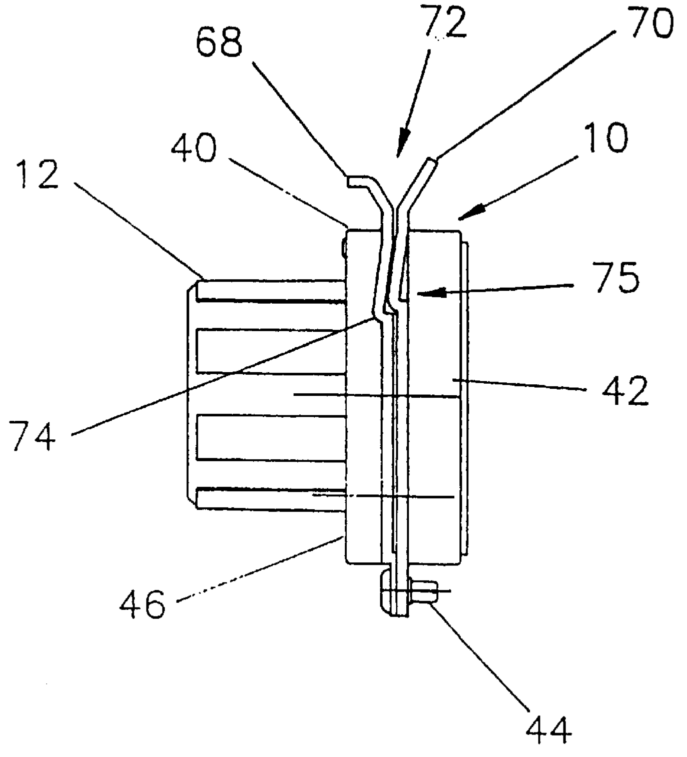
FIG. 2 is a side elevation of the reservoir and gate of FIG. 1 when assembled, the gate again being partially cut away.
Figure 3:
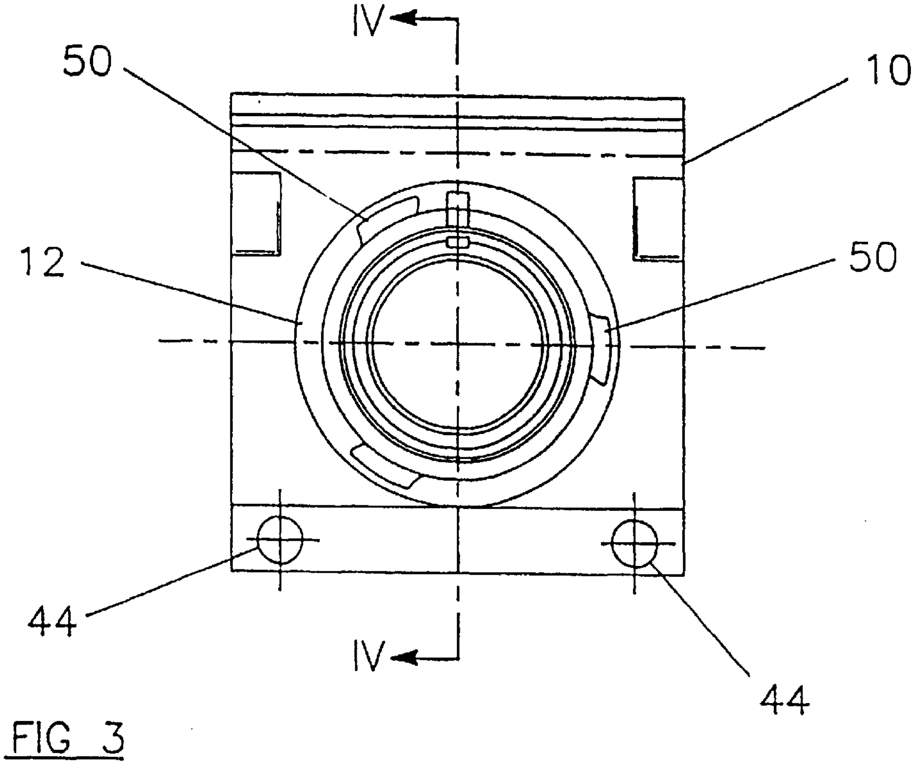
FIG. 3 is a front elevation of the assembly of FIG. 2.

Referring now to the drawings, an apparatus according to the present invention for detecting counterfeit documents comprises a gate 10 and a reservoir 12 which lock together in use but which also allow the reservoir to be replaced when its contents are exhausted.

The reservoir 12 is circular in cross section and has a wall 14 extending from the closed front wall 16 of the reservoir to a lip 18 around the periphery of the top of the wall 14 at the rear of the reservoir. The lip 18 carries a plate 20 which seals the rear of the reservoir apart from a central hole surrounded by an axially outwardly extending collar 22. The lip 18 is also provided with a number of projections 23 (in this embodiment three such projections) which extend radially outwards, each projection extending counterclockwise from a ramp 24 to a top surface 26 in which is provided a groove 28.

On the interior of the front wall 16 of the reservoir 12 is provided an axially extending wall 32 which surrounds, supports and locates one end of a nib 34 of fibrous material, the other end of the nib 34 being located in and supported by the collar 22 round the hole in the plate 20 at the rear of the reservoir.

The gate 10 consists of two rectangular covers 40 and 42 which are secured together at their bottom flanges by fixing means such as rivets 44. The cover 40 has a central circular wall 46 on its rear surface and an inwardly directed flange 48 at the top of the wall. The flange 48 has three gaps 50 equally spaced around the circumference of the wall and extending outwardly from the inner periphery of the wall. On the inner radial face of the flange are formed three axially extending ridges, each ridge being located slightly clockwise of one of the gaps 50.

Figure 5:
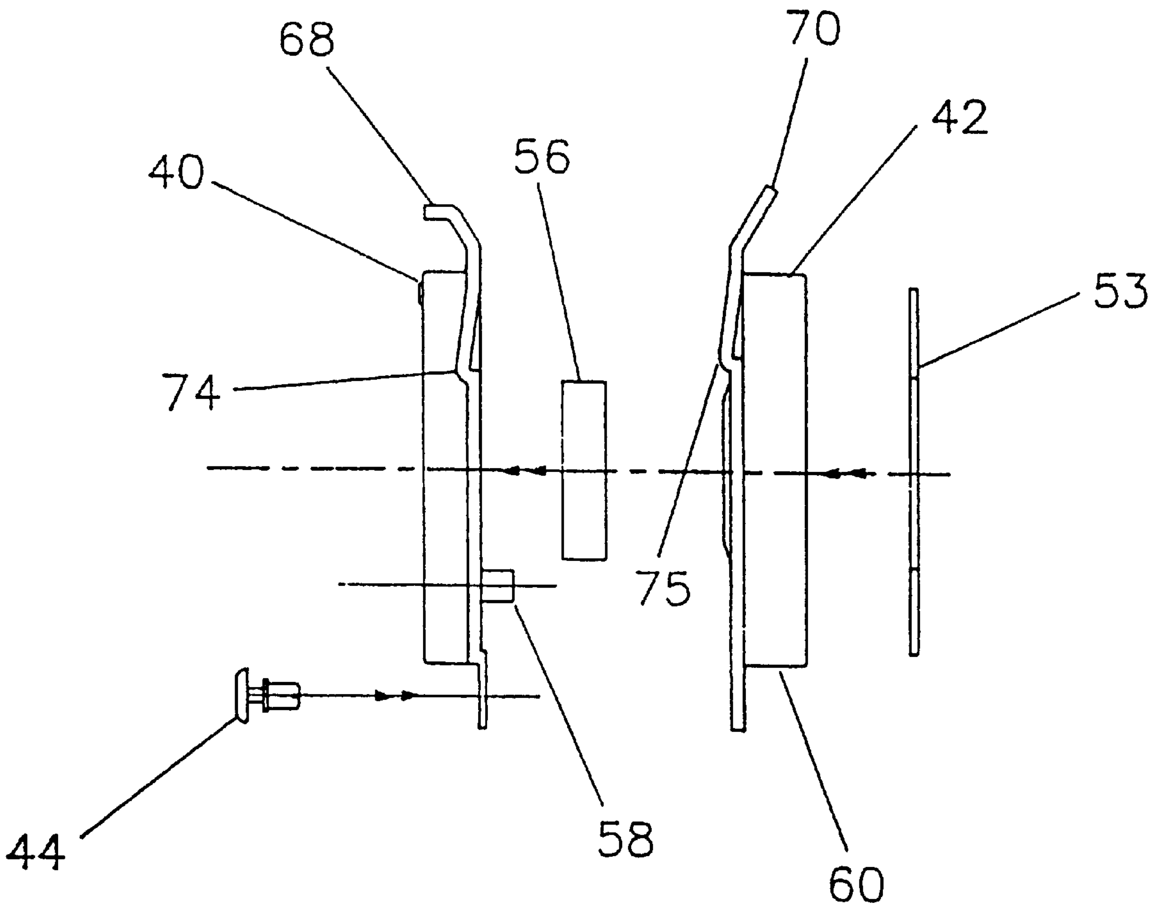
FIG. 5 is an exploded view of the components of the gate which is again partially cut away.

At the bottom of the wall 46, the rear end surface of the cover 40 is an inwardly (i.e. forwardly) extending annulus 52 with a central recess 54 which has a central hole passing therethrough. In the recess 54 is secured an annular seal 56 (see FIG. 5). Immediately below the recess 54 is a rearwardly extending projection 58.

The cover 42 also has a circular central wall projecting rearwardly and at the top of which is an annular rear end wall 62 around a central recess having a peripheral channel 64, the bottom of the channel 64 lying in the plane 66 between the covers 40 and 42. On the annular end wall of the cover 42 is provided a ring 53 having an adhesive outer surface to allow the device to be secured to a suitable surface when in use.

The top edges 68 and 70 of the covers 40 and 42 are splayed apart to provide a guide path 72 into the plane between the covers. The side edges of the covers 40 and 42, on their internal surfaces as shown in the drawings, have a small interfitting recess 74 and projection 75 which are out of the plane between the covers.

The covers 40 and 42 are made of a plastics material which combines the necessary strength with a degree of natural resilience.

In use, the reservoir 12 is mounted on the cover by inserting the projections 23 into the holes 50 in the flange 48 so that the projections lie below the flange and then twisting the reservoir clockwise relative to the cover 46 until the ridges on the inner surface of the flange ride up the ramps 24 and engage the grooves 28 to lock the reservoir in position on the cover 40

Figure 4:
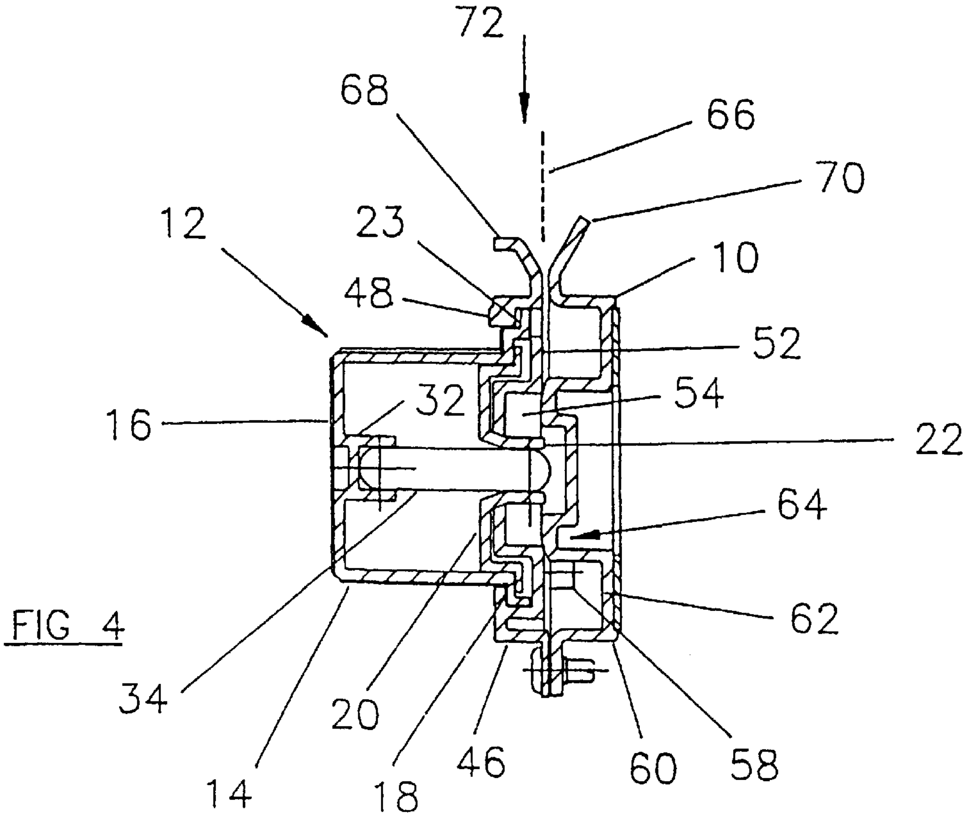
FIG. 4 is a section on the line IV—IV of FIG. 3.

As seen in FIG. 4, the tip of the nib 34 then extends slightly through the plane between the covers and is surrounded by the seal 56 which engages the bottom of the recess 54 and the front surface beneath the bottom of the channel 64 to seal the nib 34 from the outside atmosphere and restrict or prevent evaporation of the contents of the reservoir from the tip of the nib.

The reservoir is filled with a liquid which reacts in a known way with a component or one or more ingredients within the printing or makeup of a document to be checked, such as a secure paper or banknote, to provide a visible distinction between genuine and counterfeit documents when applied thereto. Preferably the liquid leaves virtually no mark when applied to a genuine document but leaves a clearly visible mark when applied to a counterfeit document.

When a paper or banknote is inserted into the guide path 66 and moved down the plane between the two covers 40 and 42, it encounters the projection 75 within the covers and forces the covers to move apart about the hinge, effectively formed by the flanges at the bottom of the covers, against the natural resilience of the material of the covers. By moving the seal 56 and the nib 34 away from the cover 42, this movement; opens up a path between the covers allowing paper to pass down beyond the nib while remaining in contact with the nib. The projection 58 acts as a stop limiting the downward movement of the paper by engaging its bottom edge. From this position, withdrawal of the paper causes the nib to apply a line of the liquid to the paper and to show the paper to be genuine or counterfeit.

The embodiment described may have added to it a light box located behind the guide path so that a banknote left in the guide path as in a clip, is illuminated from the rear to make visible watermarks and other markings which are present in genuine banknotes but which may be absent from counterfeits.

A further modification is the addition of a metal detector to detect the metal strip in a banknote as the note is drawn through the gate. The detector causes a visual or audible indication if metal indicative of a genuine banknote is detected.

Further modifications include the use of a refillable reservoir secured to the gate and the use of an absorbent pad within the reservoir.

Having, described the invention and an illustrated embodiment thereof, what is claimed as new and secured by Letters Patent is:

1. Apparatus for detecting counterfeit documents comprising a gate for receiving a document, a reservoir for a liquid that will react in a known way with a reactive component, a nib within the gate, the nib being disposed to be charged with liquid from the reservoir and to apply this liquid to the document received into the gate, and a seal around the nib, the seal being configured to reduce loss of the liquid upon withdrawal of the document from the gate.

2. Apparatus as claimed in claim 1, in which the reservoir is a replaceable sealed container releasably attached to the gate.

3. Apparatus as claimed in claim 1, in which the reservoir is a refillable container integral with the gate.

4. Apparatus as claimed in claim 1, in which the reservoir contains an absorbent pad.

5. Apparatus for detecting counterfeit documents, said apparatus comprising a gate for receiving a document, a reservoir for a liquid that will react in a known way with a reactive component, a nib within the gate, the nib being disposed to be charged with a liquid from the reservoir and to apply this liquid to the document received into the gate, a seal around the nib to reduce loss of the liquid when there is no document in the gate, and a metal detecting means adjacent to the gate for detecting metal in the document.

6. Apparatus for detecting counterfeit documents, said apparatus comprising a gate for receiving an document, a reservoir for a liquid that will react in a known way with a reactive component, a nib within the gate, the nib being disposed to be charged with a liquid from the reservoir and to apply this liquid to the document received into the gate, a seal around the nib to reduce loss of the liquid when there is no document in the gate, and illuminating means adjacent to the gate to pass light through the document.

7. Apparatus as claimed in claim 1, in which the gate comprises two covers hinged at one side to move apart when a document is inserted between the covers.

8. Apparatus as claimed in claim 7, in which the reservoir, nib and seal are secured to one of the covers.

9. Apparatus as claimed in claim 8, in which the covers on a side adjacent to said one side have a projection out of the plane between the covers whereby the covers are moved apart when a document being inserted into the gate encounters the projection.

10. Apparatus as claimed in claim 9, in which the covers define a guide path into the plane between the covers.

11. Apparatus for detecting counterfeit documents, said apparatus comprising two covers hinged at one side and adapted to move apart and form a gate for receiving a document, the covers having, on a side adjacent to said one side, a projection out of the plane between the covers whereby the covers are moved apart when a document being inserted into the gate encounters the projection, a reservoir for a liquid that will react in a known way with a reactive component, a nib within the gate, the nib being disposed to be charged with a liquid from the reservoir and to apply this liquid to the document received into the gate, and a seal around the nib to reduce loss of the liquid when there is no document in the gate.

12. Apparatus as claimed in claim 7, in which the covers define a guide path into the plane between the covers.

13. Apparatus as claimed in claim 8, in which the covers define a guide path into the plane between the covers.

14. Apparatus as claimed in claim 5 wherein said metal detecting means is a metal detector unit.

15. Apparatus as claimed in claim 6 wherein said illuminating means is a light box.

16. Apparatus as claimed in claim 6 wherein said illuminating means passes light through the document as the liquid is applied to the document.

17. Apparatus as claimed in claim 5 wherein said metal detecting means detects metal in the document as liquid is applied to the document.

* * * * *